July 28, 1959
G. C. SUMMERS ET AL
2,897,478
EXPLORING UNIT FOR ACOUSTICAL WELL LOGGING
Filed Feb. 13, 1956
2 Sheets-Sheet 1
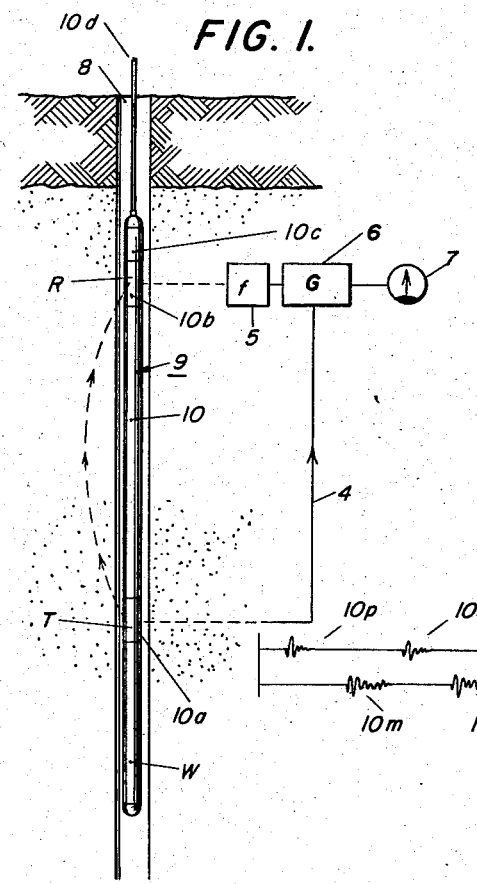
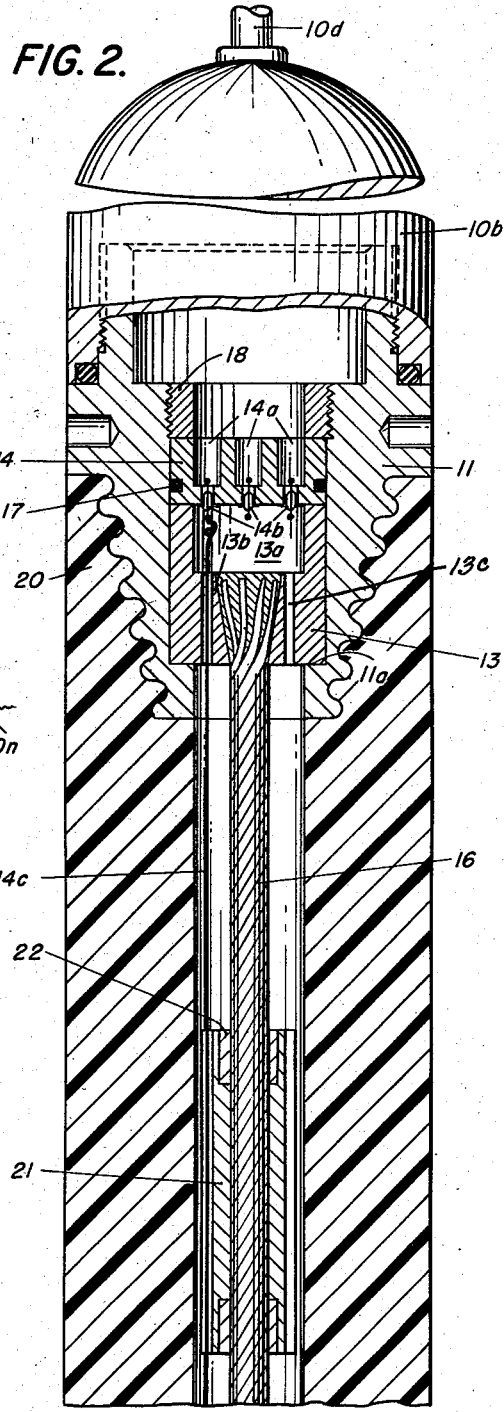

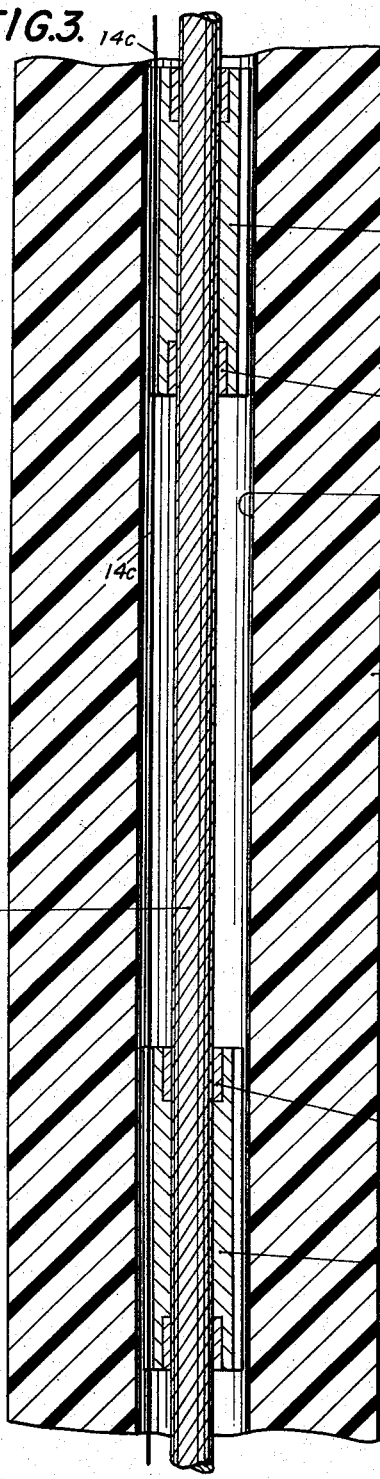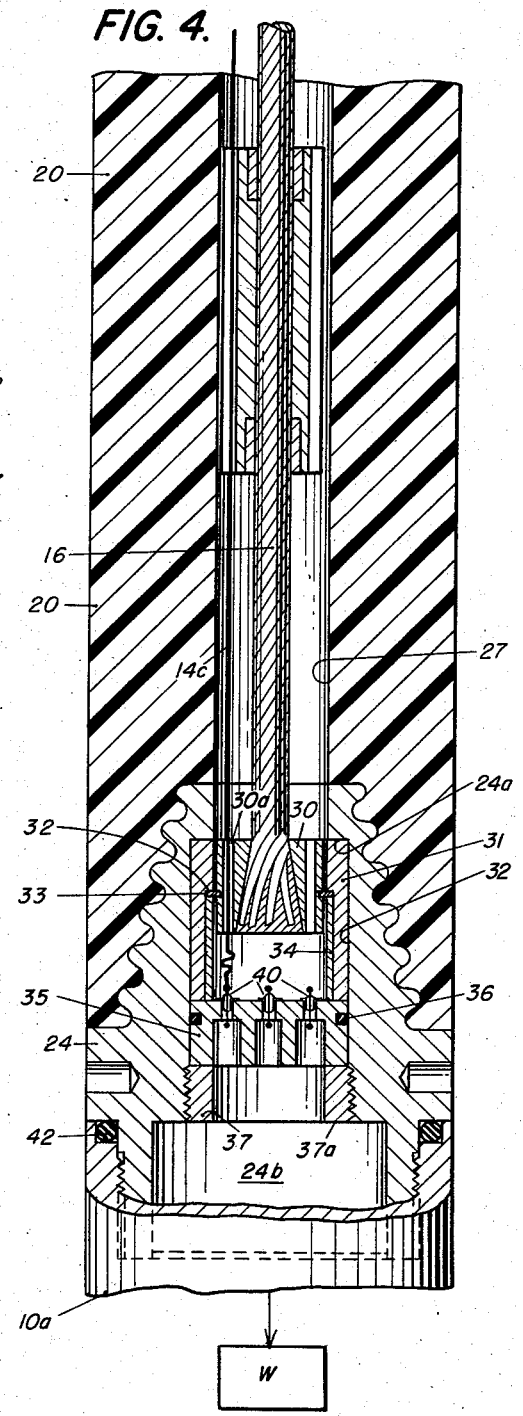

2,897,478

EXPLORING UNIT FOR ACOUSTICAL WELL LOGGING

Gerald C. Summers, Dallas, and Wilton Gravley, Carrollton, Tex., assignors, by mesne assignments, to Socony Mobil Oil Company, Inc., New York, N.Y., a corporation of New York Application February 13, 1956, Serial No. 565,204

7 Claims. (Cl. 340—18)

This invention relates to acoustic well logging, and more particularly to arrangements for maintaining transducers in a predetermined spaced-apart relation without appreciable direct transmission of acoustic energy from a transmitting transducer to a receiving transducer, whereby the principal flow of acoustic energy to a receiving transducer will be by way of formations adjacent the borehole.

While the metallic coupling means for acoustic well logging disclosed in copending application Serial No. 266,032, filed January 11, 1952, now Patent No. 2,742,629, granted to Gerald C. Summers and Robert A. Broding have been usefully employed, it has been found that the acoustical energy flowing through the coupling means from a transmitting transducer to a receiving transducer may be further reduced in magnitude. The importance of the present invention will be better understood upon consideration of the type of acoustic logging which may be undertaken as a result of movement of the acoustical exploring unit through or along a borehole. If the acoustic energy generated by the transmitter is directed to and through the formations adjacent the borehole and thence to the receiver, acoustic velocity contrasts in the earth formations can be detected and valuable information obtained as to the character of the subsurface formations along the borehole. However, the acoustical energy, after traveling such formations between the transmitter and receiver, may be obscured if any considerable amount of energy is transmitted through the mechanical supporting means provided between the transmitter and receiver.

Such direct transmission is particularly undesirable in acoustic velocity well logging where repeated measurements must accurately be made of time intervals between the instant of generation of an acoustic pulse by a transmitter, which instant may be relatively easily defined, and the instant of arrival of the first component of such acoustic pulse at a receiver after transmission through the earth formations. If energy of a detectable level is transmitted directly through the mechanical supporting means and arrives at a receiver prior to the arrival of energy traveling by way of the formations, the resultant measurements would have no relationship at all to the formation.

In carrying out the present invention in one form thereof, a borehole unit is provided with a transmitter and one or more receivers spaced one from the other by means of a flexible elongated coupling, such as a spirally-wound metallic cable. To the spirally-wound cable there are attached a plurality of weights, each having a length and cross-sectional area providing a mass which is large compared with that of a corresponding length of the elongated member or cable. These weights are spaced one from the other to provide an acoustic mismatch as between each of them and the cable extending therebetween. Such an arrangement has been found to delay, to attenuate, filter, and particularly, to reduce the flow of acoustic energy from the transmitter to each receiver.

In a further aspect of the invention there is provided an elongated flexible cylinder coupled at the ends thereof to the transmitter and receiver characterized by a central opening of dimension slightly larger than the corresponding dimensions of said cable supported weights. A liquid is employed to fill the voids in the tube, thereby to resist hydrostatically developed compressional forces. In a further aspect, the borehole unit is supported for movement along the length of a well bore and is provided with a weighting means at the bottom thereof of sufficient size to maintain the cable in tension.

For a more complete understanding of the present invention and for further objects and advantages thereof, reference may now be had to the following description taken in conjunction with the accompanying drawings in which:

Fig. 1 diagrammatically illustrates one mode of operating an exploring unit embodying the invention to make a borehole survey;

Fig. 2 is a sectional view of the upper end portion of a coupling means embodying the invention with a part of the upper end of the exploring unit also shown;

Fig. 3 is a sectional view of an intermediate portion of the coupling means; and Fig. 4 is a sectional view of the lower end of the coupling means and includes a part of the lower section of the exploring unit.

Referring now to Fig. 1, an acoustic well logging unit 9 is illustrated as comprising an acoustic insulating section 10 embodying the arrangement of the present invention and mechanically interconnecting a lower transducer 10a, for example, a transmitter, and an upper transducer 10b which may be a receiver. During travel of the exploration unit throughout the length of the well or borehole 8, the section 10 maintains the transducers in a predetermined spaced-apart relation. An amplifying section 10c may be included in the exploration unit with the output thereof transmitted by way of conductors included in a supporting cable 10d to associated measuring apparatus located at the surface.

As more fully explained in copending application Serial No. 346,593, filed April 3, 1953, now Patent No. 2,757,358, granted to John O. Ely for Mechanically Coupled Acoustic Well Logging System, a series of acoustic pulses 10p and 10s are produced by the transmitter T at a repetition rate in the low audio range, for example, from 20 to 60 times per second. Each acoustic pulse, 10p, 10s, may comprise oscillations characteristic of a 10,000 cycle per second signal. After traverse of each pulse through the strata adjacent the borehole 8, the acoustic energy activates the receiver 10b and produces pulses 10m and 10n delayed in time with respect to the preceding transmitted pulses 10p and 10s, respectively. The amplitude of the received pulses 10m and 10n or the delay occasioned by their travel from transmitter to receiver may be measured. In accordance with the disclosure of U.S. Patent to Summers No. 2,704,364, the pulses 10p and 10s are applied at spaced intervals by way of communicating channel 4 extending from transmitter 10a to the generator 6 to control the generation of a D.C. voltage. Pulses 10m and 10n from receiver R are successively applied by way of a filter network 5 to generator 6 for controlling said D.C. voltage such that it will be maintained proportional to the travel time of a pulse through the formations spanned by the coupling structure between transmitter T and receiver R. In Fig. 1 a suitable measuring means is represented by a meter 7 which is utilized to measure the voltage proportional to the aforesaid travel time.

In the aforesaid Ely application there has been claimed in combination with the system illustrated in Fig. 1 a coupling means having a plurality of weights which together with rods or tubes form an acoustical filter of the type which passes acoustic waves only of frequencies below a selected frequency, while the second filter disposed between the receiver and the amplifier 6 passes only frequency components above the selected frequency. In the present application the acoustic coupling means or acoustic insulating section 10 functions primarily as an attenuator and acoustic energy dissipator rather than as a filter which prevents flow of acoustic energy directly along the coupling means between transmitter and receiver.

There will now be set forth the manner in which applicants' acoustic insulating section 10 or coupling means employed in a "single receiver acoustic logging unit" of the type shown in Fig. 1 insures that the acoustic energy developed by the transmitter 10a travels by way of formations adjacent the borehole to the substantial exclusion of energy traveling from transmitter 10a by way of the coupling 10 to the receiver 10b.

In the modification of the invention illustrated in Figs. 2–4, the top, an intermediate portion, and the bottom portion of the coupling means have been illustrated. More particularly, Fig. 2, there is provided an end adapter 11 which may support or threadedly engage either the acoustic transmitter 10a or the receiver 10b. As illustrated, the adapter 11 is threaded at its upper end into the lower end of the support for the receiver 10b. A strain member or cable 16 is attached to the lower portion of adapter 11. The transducers 10a and 10b may be of any suitable type such as including magnetostrictive elements, or of the type disclosed in McDonald Patent No. 2,722,282, issued November 1, 1955. Transducers capable of producing a high acoustical output are to be preferred.

The lower end of the adapter 11 is generally cone-shaped with exterior circumferential grooves to provide a relatively large surface area onto which a rubber jacket 20 is molded. The adapter 11 is counter-bored or milled from the upper end thereof for disposition therein of a cable-socket 13. The socket 13 is provided with an upper cylindrical port 13a from which there extends a cylindrical funnel-shaped opening 13b which terminates at the lower end of socket 13 with a diameter corresponding to the diameter of cable 16. Cable 16 is secured in socket 13 by inserting the upper end thereof through the opening 13b and separating the various cable strands. After the strands are suitably cleaned and tinned, molten zinc is ladled into the socket 13 completely to fill the spaces between the strands, thereby to form a cone on the end of cable 16 which registers in the opening 13b. With the upper end of cable 16 thus securely anchored in the cast metal, the socket 13 is supported from the adapter 11 by the lower inwardly extending shoulder 11a thereof.

A bulkhead 14 is disposed above the cable socket and includes an annular groove in which there is disposed a sealing means such as an O-ring 17. A threaded locking collar 18 is served against the bulkhead 14 to hold the cable socket 13 against the shoulder 11a of the adapter 11.

Bulkhead 14 is provided with recesses 14a into which insulators 14b extend. Insulators 14b are hermetically sealed to the bulkhead 14 and permit passage of electrical circuits from the transmitter support 10b through the cable section 10. The insulators 14b are of the type which withstand pressures as may be exerted by hydrostatic forces on the surface of the cable section or coupling means 10. Electrical conductors such as conductor 14c extend from one of the insulators 14b through channels such as channel 13c in the socket 13 and thence downward through the cable coupling member.

A suitable distance below the end of the adapter 11, there is secured to the cable 16 a weight 21, illustrated as cylindrical, and having re-entrant bores at each end filled with molten material 22 securely to hold weight 21 to the cable 16. The molten material 22 may be zinc, solder or pure lead.

Below the weight 21, Fig. 3, a second weight 23 is similarly secured to cable 16. The number of weights spaced one from the other along the cable 16 will vary depending upon the particular degree of attenuation desired for particular operating frequencies. In one embodiment of the invention, six weights, each of lead, 3 inches in length, ⅞ of an inch in diameter and drilled to receive a ⁵⁄₁₆ inch cable were found satisfactory when spaced 9 inches apart and with the total distance between the facing ends of the cable sockets approximately 55 inches. Each such weight is provided with longitudinal peripheral channels in number corresponding to the number of conductors leading from bulkhead 14. The conductors may then be positioned in the peripheral grooves and suitably secured to maintain them in desired position. Otherwise, slack in the conductors as may be necessary for assembly at the bulkhead would permit entanglement during use which might result in circuit failure.

The molded rubber jacket 20, preferably of neoprene, is a poor transmitter of acoustic energy and alone will not conduct detectable acoustic signals directly from transmitter 10a to receiver 10b. The rubber jacket 20 is molded onto the serrated end of member 11 and extends downwardly as shown in Figs. 3 and 4 to an end coupling member 24. Coupling member 24 has a conical-shaped end which is serrated by peripheral grooves which provide a site for bonding the lower end of the jacket 20. Jacket 20 is provided with a central aperture 27 which is slightly larger than the weights 21, 23, etc. in order to permit them to be inserted during assembly of the unit. The lower end of cable 16 is flanged and embedded in zinc to be secured in a locking member 30 in the same manner as the upper end thereof. However, locking member 30 has a maximum diameter which corresponds generally with the diameter of the weights 21, 23, etc. A cylinder 31 is positioned in the re-entrant opening 32 of end member 24. Cylinder 31 is provided with a re-entrant opening to provide a shoulder 32. A locking ring 33 registers in a groove in the periphery of the locking member 30 and bears against shoulder 32. A relatively thin tube 34 is inserted into the re-entrant opening in the cylinder 31 and bears against the surface of ring 33 opposite shoulder 32. A bulkhead 35 having pressure-tight seals such as O-ring 36 is placed in bearing relation with the lower ends of cylinder 31 and tube 34. A nut 37 is served into the internally threaded end of the opening in end member 24 to force bulkhead 35 against the cylinder 31 and tube 34. Bulkhead 35 is provided with pressure-resistant feed through insulators 40 to complete liquid-tight electrical circuits through the insulator. For example, conductor 14c is shown connected through one of the insulators 40. The lower end of coupling member 24 is secured to the transmitting transducer 10a, a sealing gasket, such as O-ring 42, being provided between the abutting ends.

Because of the elasticity of the jacket 20, hydrostatic forces applied to the exterior surface thereof by the column of liquid ordinarily encountered in deep well bores tend to compress the rubber jacket. It has been found that under hydrostatic pressures of 13,000 pounds per square inch the rubber jacket will be compressed or decrease in its dimensions approximately five percent. Radial contraction may be desirable from the standpoint of developing frictional forces between the inner surface of the jacket 20 and the periphery of the spaced weights 21, 23, etc. further to damp any energy traveling through the cable 16. However, longitudinal contraction has the unwanted effect of decreasing the spacing between transmitter 10a and receiver 10b. Longitudinal changes would introduce a variable error in any velocity measurements. Any such error would be dependent upon the depth to which the logging unit is submerged in borehole fluids. The cable 16 would be forced into tortuous configuration between the transmitter 10a and receiver 10b since the ends thereof are secured in the coupling members 11 and 24. With the cable free to move, the electrical conductors such as conductor 14a would be subjected to wear and possible failure. In order to avoid such problems and to make certain that cable 16 is at all times maintained in tension, a weight W, Fig. 1, (diagrammatically indicated as weight W in Fig. 4) is secured to the lower end of the logging unit. The weight W ordinarily is such as to overcome the compressive forces tending to shorten the coupler. Weights of between 30 pounds and several hundred pounds have been employed. Ordinarily the weight W at least in part will be comprised of the transmitter 10a and any required electrical components necessary to actuate transmitter 10a. Such components may conveniently be housed in the unit W, Fig. 1. If the components themselves are not of sufficient weight to maintain the cable 16 in tension, additional mass may be secured to the lower end thereof.

In assemblying the coupling unit, end members 11 and 24 are first molded into the ends of jacket 20. There is thus provided an elongated structure with a central aperture extending the length thereof. The elongated structure is then supported in any suitable vise-like means axially to compress the rubber jacket and temporarily shorten it by an amount approximately equal the distance from the shoulder 24a in end member 24 and the upper surface 37a of the nut 37. An insert is then formed which comprises cable 16 with socket 13 and locking member 30 secured to opposite ends thereof. Weights 22, 23 are secured at spaced points along the length thereof and conductors such as conductor 14c suitably positioned about the periphery of the weights and extending through ports such as port 13c. The insert is then threaded through the rubber jacket 20 with locking member 30 being first threaded through coupling 11. When socket 13 is seated on shoulder 11a, the locking member 30 will extend into the chamber 24b of end member 24 since the jacket 20 is compressed. Cylinder 31 is then inserted into end member 24 into bearing relation with shoulder 24a. The spanning washer 33 is then slipped over the end of the locking member 30 and snapped into a groove milled into the periphery of locking member 30. Compressive forces on the jacket 20 are then released, permitting jacket 20 to assume its normal dimensions and, as it does so, locking member 30 is drawn into the recess of cylinder 31. When all compressive forces on jacket 20 are substantially entirely relieved, the washer 33 is in bearing relation with shoulder 32 and cable 16 preferably is slightly in tension. Tube 34 is then inserted into the recess in member 31. Conductors extending through jacket 20, such as conductor 14, are made of sufficient length to permit them to be soldered to the terminals of the feed through insulators 40. Such conductors are then folded in the space adjacent the end of locking member 30 as bulkhead 35 is positioned adjacent the ends of cylinder 34 and tube 31. Locking nut 37 is then served into place.

At this point, the coupling unit has a hollow annular well between the cable 16 and jacket 20. The lower end of the hollow well is closed by bulkhead 14. A suitable non-conductive liquid such as castor oil is then heated to a temperature sufficient to remove all water therefrom and is then poured into the coupling from the upper end thereof. The fluid used preferably has the same general compressibility as the rubber jacket 20. With the coupling filled to the point that oil level is above the upper end of socket 13, the bulkhead 14 is placed in position with any excess oil being forced back into the pliable rubber jacket 20. Nut 18 is employed for the purpose of properly positioning bulkhead 14a.

The preferred form of coupling thus illustrated and described provides a unit which is flexible and may be subjected to relatively rough treatment in transportation to points of use and in service as a component of a logging system. It is provided with the cable 16 which will not permit elongation thereof and thus will maintain the transmitter and receiver a predetermined maximum distance apart. Cable 16 is of strength sufficient to permit application of substantial forces to recover the instrument should it become lodged at depth in a borehole. The system readily admits the use of a weight to prevent shortening of the spacing between the transmitter and receiver. The electrical conductors extending through the unit are protected from application of forces by reason of the fluid medium in which they are immersed. Frictional forces applied to the periphery of the lead weights positioned along the cable serve to damp any accoustic energy being transmitted through the cable.

While the preferred form of the invention has been illustrated and described in connection with a "single receiver" system, it will be readily apparent that a "two receiver" system may similarly be provided with means above described to control or eliminate direct flow of accoustic energy not only from a transmitter to a first receiver but also over the interval between the two receivers of such a system. It is to be understood variations in design features of the invention may be made within the scope of the appended claims. For example, the spacing of the weights, their cross-sectional area and shape and length and number represent variables which will depend upon particular applications. At least, three weights should be used and the acoustic discontinuities provided by them should be substantial, i.e., of the order of the above-described embodiment of the invention.

What is claimed is:

1. In an acoustic well logging unit having acoustic transducers to be maintained in a predetermined spaced-apart relation the combination which comprises a coupling member between said transducers comprising a hollow elongated rubber jacket secured in a fluid-tight relation at each end thereof to one end of said transducers, a flexible elongated strain member extending through said rubber jacket and secured at each end thereof to one of said transducers, a plurality of weights secured to said strain member at spaced points therealong, each of said weights having cross-sectional dimensions approximately equal the inner dimensions of said jacket and each providing a mass which is large compared with that of the corresponding length of said strain member, and a fluid completely inundating said strain member and said weights within said rubber jacket.

2. The combination set forth in claim 1 in which said fluid and said rubber jacket have approximately equal pressure coefficients.

3. In an acoustic well logging unit having acoustic transducers to be maintained in a predetermined spaced-apart relation the combination which comprises a coupling member between said transducers comprising a hollow elongated rubber jacket secured in a fluid-tight relation at each end thereof to one of said transducers, a flexible elongated strain member extending through said rubber jacket and secured at each end thereof to one of said transducers, a plurality of weights secured to said strain member at spaced points therealong, each of said weights having cross-sectional dimensions approximately equal the inner dimensions of said jacket and each providing a mass which is large compared with that of the corresponding length of said strain member, a fluid completely inundating said strain member and said weights within said rubber jacket to withstand hydrostatically developed compressional forces as said unit is lowered into a well bore, and weighting means coupled to the lower end of said coupling member to oppose hydrostatically developed forces tending to shorten said coupling member and to maintain said strain member under tension at all levels in said well bore.

4. A flexible coupling for an acoustic transmitter and an acoustic receiver for use in well logging which comprises an elongated rubber cylinder secured in fluid-tight relation at the ends thereof to said transmitter and receiver respectively, and having a cylindrical opening extending therethrough, a flexible strain member secured at the ends thereof to said transmitter and receiver and extending through said opening, a plurality of weights secured at spaced points along said flexible strain member to establish appreciable acoustic discontinuities along said strain member, electrical conductors extending between said transmitter and receiver, fluid-tight electrically conductive circuit completing closure means for said opening adjacent said transmitter and adjacent said receiver and connected to said electrical conductors, and a non-conductive liquid filling the voids in said opening between said closure means.

5. The combination set forth in claim 4 in which said weights are provided with longitudinal peripheral grooves to receive and position said electrical conductors.

6. A flexible coupling for an acoustic well logging system comprising a pair of cone-shaped end members each having an axial opening therethrough, each opening being re-entrant at the cone base, a cylindrical rubber jacket molded at each end thereof to the exterior of said cones and having a central channel of substantially the same cross-sectional area as said openings, a strain member threaded through said jacket and releasably secured at the ends thereof in said re-entrant openings, electrically conductive, fluid-tight seal means in each of said re-entrant openings to form with said jacket a fluid-tight housing for said strain member, electrical circuit means extending between said seal means in each said end member, a plurality of weights secured at spaced points to said strain member each adapted to provide an acoustic discontinuity in said strain member, and a non-conductive liquid completely filling the voids inside said jacket.

7. A flexible coupling for an acoustic well logging system comprising a pair of cone-shaped end members each having an axial opening therethrough, each opening being re-entrant at the cone base, a cylindrical rubber jacket molded at each end thereof to the exterior of said end members and having a central channel of substantially the same cross-sectional area as said openings, a strain member extending through said channel between said end members, a socket on one end of said strain member and positioned in a first of said end members, closure means for seating said socket in the re-entrant opening in said first end member, a locking member secured to the other end of said strain member and positioned in the opening of the second of said end members, a cylinder having a re-entrant opening positioned in the re-entrant opening in the second of said end members, a spanning washer fitted in a peripheral groove around said locking member at the extremity of the re-entrant opening in said cylinder, a thrust cylinder in said last named opening, closure means for simultaneously seating said cylinders, weights secured to said strain member at spaced points along the length thereof, and a fluid filling the voids between said jacket and said strain member.

References Cited in the file of this patent

UNITED STATES PATENTS

| | | |
|---|---|---|
| 2,742,629 | Summers | Apr. 17, 1956 |
| 2,757,358 | Ely | July 31, 1956 |